US012436249B2

(12) United States Patent
Saiki (10) Patent No.: US 12,436,249 B2
(45) Date of Patent: Oct. 7, 2025

(54) DISTANCE ESTIMATION DEVICE

(71) Applicant: DENSO CORPORATION, Kariya (JP)

(72) Inventor: Takashi Saiki, Kariya (JP)

(73) Assignee: DENSO CORPORATION, Kariya (JP)

( * ) Notice: Subject to any disclaimer, the term of this patent is extended or adjusted under 35 U.S.C. 154(b) by 317 days.

(21) Appl. No.: 17/947,245

(22) Filed: Sep. 19, 2022

(65) Prior Publication Data

US 2023/0016818 A1    Jan. 19, 2023

Related U.S. Application Data

(63) Continuation of application No. PCT/JP2021/003067, filed on Jan. 28, 2021.

(30) Foreign Application Priority Data

Mar. 26, 2020   (JP) .................................. 2020-056486

(51) Int. Cl.
   *G01S 11/02*  (2010.01)
   *H04W 64/00*  (2009.01)
(52) U.S. Cl.
   CPC ............. *G01S 11/02* (2013.01); *H04W 64/00* (2013.01)
(58) Field of Classification Search
   CPC ........ G01S 13/36; G01S 13/87; G01S 13/931; G01S 13/765; G01S 13/4454; G01S 7/40; G01S 2013/9316
   USPC .................................................. 342/127, 70
   See application file for complete search history.

(56) References Cited

U.S. PATENT DOCUMENTS

| 4,914,642 | A  | * | 4/1990  | Fraser ..................... G01S 3/808 367/122 |
| 5,374,932 | A  | * | 12/1994 | Wyschogrod ........... G01S 13/91 342/39 |
| 5,933,079 | A  | * | 8/1999  | Frink ...................... G01S 13/76 340/573.1 |
| 6,373,508 | B1 | * | 4/2002  | Moengen ................ G01S 19/14 715/848 |
| 7,061,369 | B2 | * | 6/2006  | Bergerhoff .............. B60R 25/20 342/127 |
| 7,843,379 | B2 | * | 11/2010 | Menzer .................. G01S 13/765 356/5.1 |
| 7,969,963 | B2 | * | 6/2011  | Duan ..................... G01S 13/765 342/458 |

(Continued)

FOREIGN PATENT DOCUMENTS

JP            2018194329 A      12/2018

*Primary Examiner* — Michael W Justice
(74) *Attorney, Agent, or Firm* — Harness, Dickey & Pierce, P.L.C.

(57) ABSTRACT

A distance estimation device includes: a portable terminal; a communication device; a distance estimation unit estimating a distance between the portable terminal and the communication device; and a phase determination unit. The communication device determining a phase shift amount from a reference phase following a predetermined generating rule and generates measuring data by applying the determined phase shift amount. The phase determination unit determines a distance estimation phase for distance estimating purpose. The distance estimation unit adopts an estimated distance when a difference between the estimated distances respectively calculated based on at least two sets of combinations of the distance estimation phases is within a predetermined range.

6 Claims, 8 Drawing Sheets

(56) References Cited

U.S. PATENT DOCUMENTS

| | | | | |
|---|---|---|---|---|
| 8,736,482 B2* | 5/2014 | Wu | G01S 13/785 |
| | | | 342/30 |
| 10,469,184 B1* | 11/2019 | Yu | H04J 3/0682 |
| 10,502,808 B2* | 12/2019 | Nishikawa | G07C 9/00309 |
| 10,534,069 B2* | 1/2020 | Asanuma | G01S 13/345 |
| 10,587,366 B2* | 3/2020 | Chervyakov | H04L 25/0224 |
| 10,775,489 B2* | 9/2020 | Rao | G01S 13/931 |
| 10,884,409 B2* | 1/2021 | Mercep | G06T 7/277 |
| 10,908,253 B2* | 2/2021 | Beise | G01S 7/34 |
| 10,976,419 B2* | 4/2021 | Ootaka | G01S 17/32 |
| 11,014,518 B2* | 5/2021 | Akamine | G01S 13/66 |
| 11,394,595 B2* | 7/2022 | Lee | G01S 5/0289 |
| 11,470,450 B2* | 10/2022 | Zand | G01S 13/765 |
| 11,486,993 B2* | 11/2022 | Habib | G01S 13/288 |
| 11,513,209 B2* | 11/2022 | Yu | H04J 3/0682 |
| 11,821,978 B2* | 11/2023 | El Soussi | H04L 63/1466 |
| 2003/0090365 A1* | 5/2003 | Bergerhoff | G07C 9/00309 |
| | | | 340/5.61 |
| 2008/0231498 A1* | 9/2008 | Menzer | G01S 13/765 |
| | | | 342/134 |
| 2010/0172339 A1* | 7/2010 | Duan | G01S 13/765 |
| | | | 370/350 |
| 2012/0162014 A1* | 6/2012 | Wu | G01S 5/10 |
| | | | 342/387 |
| 2017/0363716 A1* | 12/2017 | Asanuma | G01S 7/354 |
| 2018/0172813 A1* | 6/2018 | Rao | G01S 13/343 |
| 2018/0241508 A1* | 8/2018 | Chervyakov | H04L 27/2675 |
| 2018/0314921 A1* | 11/2018 | Mercep | G01S 15/86 |
| 2019/0143925 A1* | 5/2019 | Akamine | B60R 21/01 |
| | | | 342/70 |
| 2019/0187262 A1* | 6/2019 | Moe | G01S 13/825 |
| 2019/0319722 A1* | 10/2019 | Yu | H04L 7/033 |
| 2020/0264297 A1* | 8/2020 | El Soussi | H04W 12/12 |
| 2020/0386853 A1* | 12/2020 | Beise | G01S 7/354 |
| 2021/0190935 A1* | 6/2021 | Yu | G01S 13/84 |
| 2022/0201431 A1* | 6/2022 | Zand | H04W 4/029 |

* cited by examiner

DISTANCE ESTIMATION DEVICE

CROSS REFERENCE TO RELATED APPLICATIONS

The present application is a continuation application of International Patent Application No. PCT/JP2021/003067 filed on Jan. 28, 2021, which designated the U.S. and claims the benefit of priority from Japanese Patent Application No. 2020-056486 filed on Mar. 26, 2020. The entire disclosures of all of the above applications are incorporated herein by reference.

TECHNICAL FIELD

The present disclosure relates to a distance estimation device estimating a distance between a portable terminal and a communication device.

BACKGROUND

Conventionally, for estimating a distance between a portable terminal and a communication device, a method of measuring traveling time of a radio wave between the portable terminal and the communication device is known.

SUMMARY

The present disclosure provides a distance estimation device including: a portable terminal; a communication device; a distance estimation unit estimating a distance between the portable terminal and the communication device; and a phase determination unit. The portable terminal includes: a terminal communication unit performing data transmission and reception with the communication device; a terminal control unit controlling the terminal communication unit; and a phase acquisition unit, when the terminal communication unit receives measuring data for distance estimating purpose, acquiring a phase of a radio wave from the received measuring data. The communication device includes: a device communication unit performing the data transmission and reception with the portable terminal; a device control unit controlling the device communication unit; and a data generating unit determining a phase shift amount from a reference phase following a predetermined generating rule and generating the measuring data by applying the determined phase shift amount, the data generating unit generating a plurality of the measuring data at a plurality of different frequencies.

The phase determination unit determines a distance estimation phase for distance estimating purpose corresponding to each of the plurality of measuring data based on the phase acquired by the phase acquisition unit and the predetermined generating rule. The distance estimation unit generates at least two sets of combinations of the distance estimation phase at one of the plurality of different frequencies and the distance estimation phase at a different one of the plurality of different frequencies, and estimates the distance between the portable terminal and the communication device based on a phase difference between the distance estimation phase included in each of the at least two sets of combinations.

The distance estimation unit adopts the estimated distance when a difference between the distances respectively calculated based on the at least two sets of combinations of the distance estimation phases is within a predetermined range, and does not adopt the estimated distance when the difference between the distances respectively calculated based on the at least two sets of combinations of the distance estimation phases is out of the predetermined range.

BRIEF DESCRIPTION OF DRAWINGS

Objects, features and advantages of the present disclosure will become apparent from the following detailed description made with reference to the accompanying drawings. In the drawings.

DETAILED DESCRIPTION

Before describing embodiments of the present disclosure, a known technology is described. Conventionally, a technology of measuring a distance between a portable terminal and a communication device only uses propagation time of radio wave. This method has a risk of erroneously determining propagation time due to interference caused by other radio wave products and delay waves of multipath.

According to an aspect of the present disclosure, a distance estimation device includes: a portable terminal; a communication device; a distance estimation unit estimating a distance between the portable terminal and the communication device; and a phase determination unit. The portable terminal includes: a terminal communication unit performing data transmission and reception with the communication device; a terminal control unit controlling the terminal communication unit; and a phase acquisition unit, when the terminal communication unit receives measuring data for distance estimating purpose, acquiring a phase of a radio wave from the received measuring data. The communication device includes: a device communication unit performing the data transmission and reception with the portable terminal; a device control unit controlling the device communication unit; and a data generating unit determining a phase shift amount from a reference phase following a predetermined generating rule and generating the measuring data by applying the determined phase shift amount, the data generating unit generating a plurality of the measuring data at a plurality of different frequencies.

The phase determination unit determines a distance estimation phase for distance estimating purpose corresponding to each of the plurality of measuring data based on the phase acquired by the phase acquisition unit and the predetermined generating rule. The distance estimation unit generates at least two sets of combinations of the distance estimation phase at one of the plurality of different frequencies and the distance estimation phase at a different one of the plurality of different frequencies, and estimates the distance between the portable terminal and the communication device based on a phase difference between the distance estimation phase included in each of the at least two sets of combinations. The distance estimation unit adopts the estimated distance when a difference between the distances respectively calculated based on the at least two sets of combinations of the distance estimation phases is within a predetermined range, and does not adopt the estimated distance when the difference between the distances respectively calculated based on the at least two sets of combinations of the distance estimation phases is out of the predetermined range.

In the above distance estimation device, the transmission processing unit generates, according to the generating rule, a distance measuring radio wave from the reference phase by applying the phase shift amount. Thus, when the generating rule is unknown, it is difficult to specify the reference phase. Even if a third party transmits illegal data to the portable device and the in-vehicle device using an illegal device, the distance cannot be properly estimated since the generating rule is unknown to the illegal device. Therefore, the process is able to eliminate the communication from the third party.

The distance estimation device further includes the phase determination unit determining the distance estimating purpose phase for each of the multiple measuring data based on the phase acquired from the portable terminal and the predetermined generating rule. The distance estimation device estimates the distance between the portable terminal and the communication device using the phase difference. The distance estimation unit estimates multiple distances using multiple combinations of frequencies. When difference between the estimated multiple distances is within a predetermined range, the estimated distance is adopted. Because the multiple distances are estimated using the phases of the radio waves at multiple frequencies, erroneous estimation can be restricted and an accuracy of estimation can be improved.

The following describes embodiments for carrying out the present disclosure with reference to the drawings. In each embodiment, a part corresponding to the part described in the preceding embodiment may be denoted by the same reference symbol or a reference symbol with one character added to the preceding reference symbol; thereby, redundant explanation may be abbreviated. In each embodiment, when only part of the configuration is described, the other part of the configuration can be the same as that in the preceding embodiment. The present disclosure is not limited to combinations of embodiments which combine parts that are explicitly described as being combinable. As long as no problems are present, the various embodiments may be partially combined with each other even if not explicitly described.

First Embodiment

The following describes a first embodiment according to the present disclosure with reference to FIG. 1 to FIG. 8. An in-vehicle system 100 includes an in-vehicle device 103 mounted on a vehicle 105, and a portable device 102 carried by a user of the vehicle 105. The portable device 102 is linked with the in-vehicle device 103, and has a function as a unique key to the vehicle 105. The in-vehicle device 103 and the portable device 102 each has a function for implementing the remote keyless entry system.

Figure 1:
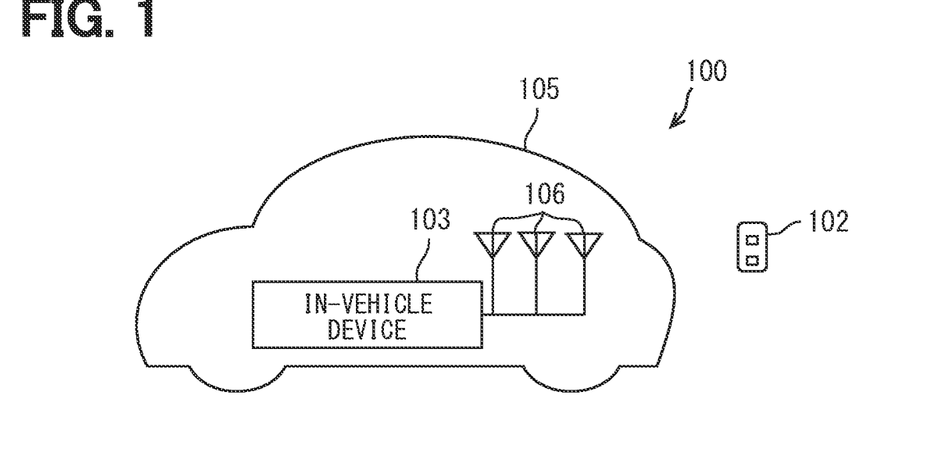
FIG. 1 is a diagram showing an in-vehicle system.

The portable device 102 includes multiple terminal switches 23 to be operated by the user, and transmits, to the in-vehicle device 103, an instruction signal corresponding to one of the terminal switches 23 operated by the user. Upon receiving the instruction signal transmitted from the portable device 102, the in-vehicle device 103 controls the vehicle according to the received instruction signal. For example, the in-vehicle device 103 controls a locking state of a door of the vehicle according to the instruction signal transmitted from the portable device 102.

The in-vehicle device 103 and the portable device 102 are configured to implement a smart entry system by carrying out wireless communication using radio waves at a predetermined frequency band with each other. Specifically, the in-vehicle device 103 is configured to transmit signals toward a vehicle interior and a predetermined range around the vehicle 105, and receive a signal transmitted from the portable device 102. The portable device 102 is configured to receive a signal transmitted from the in-vehicle device 103 and return a predetermined signal to the in-vehicle system 100.

When the portable device 102 is in a collation area, the in-vehicle device 103 executes collation by performing wireless communication with the portable device 102. When the collation is established, various controls to lock the doors, start the engine, and the like are executed. The collation process is a process in which the in-vehicle device 103 authenticates that a communication terminal, performing wireless communication with itself, is a valid portable device 102 linked with the in-vehicle device 103.

When the in-vehicle device 103 authenticates validity of the portable device 102 existing in the collation area of the in-vehicle device 103 via wireless communication, the user carrying the portable device 102 is able to lock and unlock the door, and start and stop the engine without operating the portable device 102.

Figure 2:
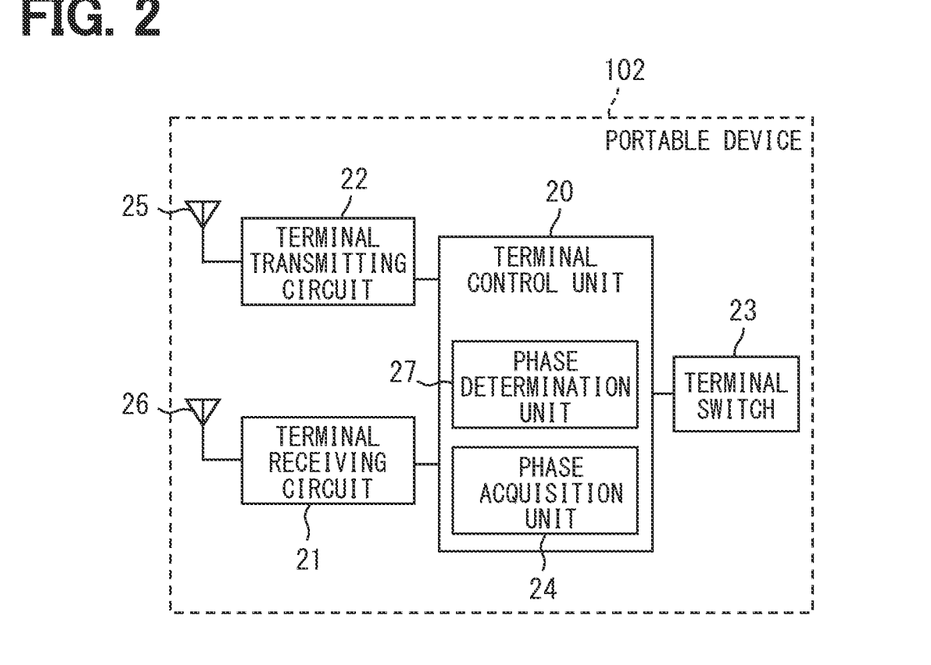
FIG. 2 is a block diagram showing a portable device.

The portable device 102 will be described with reference to FIG. 2. The portable device 102 includes a terminal receiving circuit 21, a terminal transmitting circuit 22, and a terminal control unit 20. The portable device 102 further includes a terminal receiving antenna 26, a terminal transmitting antenna 25, and at least one of the multiple terminal switches 23.

The terminal receiving circuit 21 and the terminal transmitting circuit 22 function as a terminal communication unit, and perform data transmission and reception with another device, for example, the in-vehicle device 103. The terminal receiving circuit 21 receives a signal from another device using the terminal receiving antenna 26 of the portable device 102, and transmits the received signal to the terminal control unit 20. The terminal transmitting circuit 22 is controlled by the terminal control unit 20 and transmits a predetermined signal to another device using the terminal transmitting antenna 25.

The terminal receiving antenna 26 is an antenna for receiving radio waves. The terminal receiving antenna 26 is connected to the terminal receiving circuit 21. The terminal receiving antenna 26 converts the received radio waves into electrical signals, and outputs the received radio waves to the terminal receiving circuit 21.

The terminal receiving circuit 21 extracts the data in the received signal by performing predetermined processing, such as analog-to-digital conversion, demodulation, and decoding, to the signal input from the terminal receiving antenna 26. The terminal receiving circuit 21 transmits the extracted data to the terminal control unit 20.

The terminal switches 23 are switches for the user to use a function, such as a keyless entry system. The portable device 102 is equipped with switches (i.e., the terminal switches 23) for locking and unlocking all of the doors. When the user presses the switch, a control signal, indicating that the switch has been pressed, is output to the terminal control unit 20.

When receiving control signal input from the terminal switch 23, the terminal control unit 20 detects that a user operation has been performed to control locking state, such as locking or unlocking of the door on the vehicle 105, and specifies the content of such instruction.

The terminal control unit 20 mainly includes a microcomputer equipped with a CPU, a RAM, a ROM, an I/O, and the like. The ROM stores control program that implements a general microcomputer as the terminal control unit 20.

The terminal control unit 20 executes a process in the portable device 102 for implementing the smart entry system or the like by running the control program stored in the ROM by the CPU. In addition to the control program, the ROM stores a terminal ID that is unique identification information of the portable device 102. The terminal control unit 20 performs collation using, for example, the terminal ID and a vehicle ID. For example, a predetermined terminal ID is linked with a predetermined vehicle ID in advance on a one-to-one basis, and when the IDs are acquired, the collation is conducted to determine whether or not the IDs are linked.

The terminal transmitting circuit 22 converts a baseband signal input from the terminal control unit 20 into a carrier signal by performing a predetermined process, such as coding, modulation, and digital to analog conversion. The terminal transmitting circuit 22 outputs the generated carrier signal to the terminal transmitting antenna 25. The terminal transmitting antenna 25 converts the input signal into radio wave and radiates the radio wave into space.

The terminal control unit 20 generates a signal to be transmitted to the in-vehicle device 103, and outputs the generated signal to the terminal transmitting circuit 22. For example, when the terminal receiving circuit 21 receives a signal transmitted from the in-vehicle device 103, the terminal receiving circuit 21 generates a predetermined signal to be transmitted as a response to the received signal, and transmits the predetermined signal to the terminal transmitting circuit 22.

When the control signal indicating the terminal switch 23 pressed by the user is input, the instruction signal is generated to control the vehicle corresponding to the operation made on the terminal switch 23, which outputs the control signal. For example, when the switch for unlocking all of the doors is pressed, an instruction signal instructing to unlock all of the doors is generated and output to the terminal transmitting circuit 22.

The terminal control unit 20 includes a phase acquisition unit 24 and a phase determination unit 27 as functional blocks. When the phase acquisition unit 24 receives multiple distance measuring radio waves, it acquires a phase of each distance measuring radio wave. Each distance measuring radio wave is the measuring data for estimating the distance between the in-vehicle device 103 and the portable device 102. The distance measuring radio wave is transmitted from the in-vehicle device 103. The phase of each distance measuring radio wave is set to a predetermined value, for example, 0, in advance.

The phase determination unit 27 determines a distance estimation phase of each of the multiple distance measuring radio waves for distance estimation purpose based on the phase acquired by the phase acquisition unit 24 and a generating rule determined in advance. The phase determination unit 27 stores, in advance, the same generating rule for the distance measuring radio waves with the generating rule used in the in-vehicle device 103.

Figure 3:
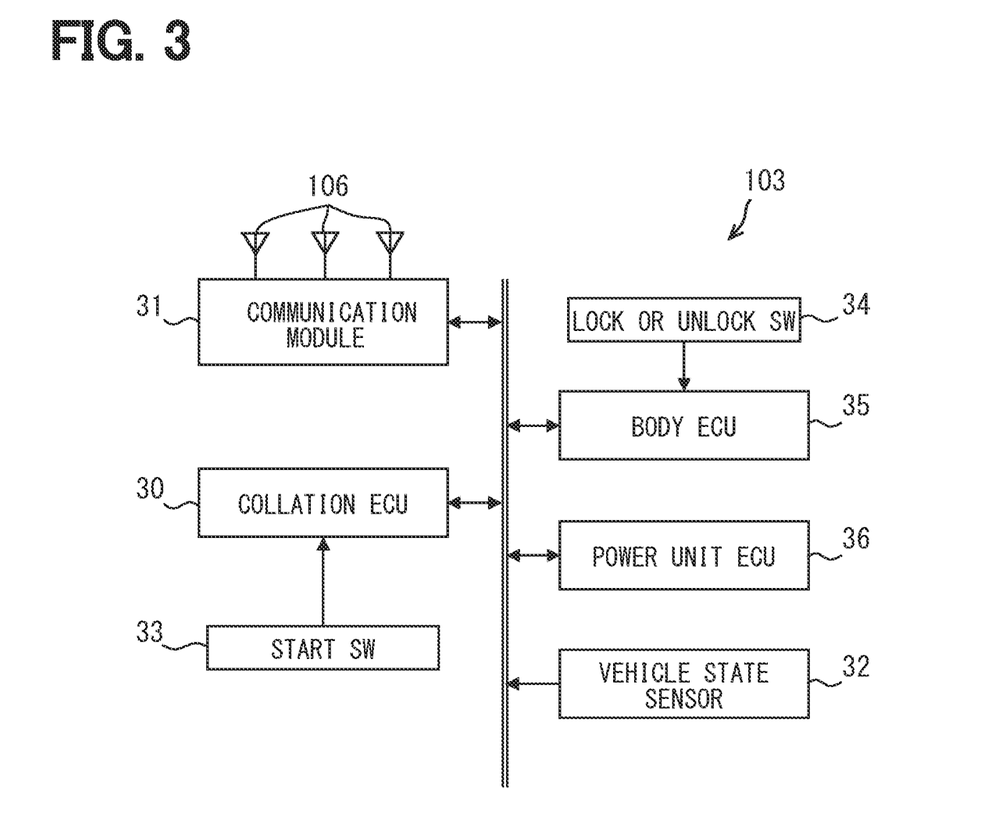
FIG. 3 is a block diagram showing an in-vehicle device.

The in-vehicle device 103 will be described with reference to FIG. 3. The in-vehicle device 103 has a communication function for communicating with another device, for example, the portable device 102. The in-vehicle device 103 operates as a communication device. The in-vehicle device 103 executes various processes for implementing the smart entry system or the keyless entry system. The in-vehicle device 103 includes a collation ECU (Electronic Control Unit) 30, a vehicle communication module 31, a vehicle state sensor 32, a start switch (hereinafter, start SW) 33, a locking or unlocking switch (hereinafter, locking or unlocking SW) 34, a body ECU 35, and a power unit ECU 36.

The vehicle communication module 31 is an in-vehicle communication module. The vehicle communication module 31 functions as a device communication unit that communicates with the portable device 102. By connecting the vehicle communication module 31 to a network, it is also possible to communicate via a cloud system. The vehicle communication module 31 includes a DCM (Data Communication Module). The vehicle communication module 31 includes a memory, and for example, the vehicle ID may be stored in the memory in advance. The vehicle communication module 31 is configured to transmit, for example, the vehicle ID stored in the memory to a communication connection destination when establishing the communication.

The vehicle communication module 31 is connected to multiple, at least three, vehicle-mounted antennas 106. In the present embodiment, the vehicle communication module 31 is connected to three vehicle-mounted antennas 106. The three vehicle-mounted antennas 106 are mounted at different positions of the vehicle 105, for example, a left portion, a front portion, and a right portion, respectively.

The vehicle-mounted antenna 106 converts the input signal into the radio wave and radiates the radio wave into space. The vehicle-mounted antenna 106 receives the radio wave and converts the received radio wave into an electrical signal. The converted electric signal is output to the vehicle communication module 31.

The vehicle-mounted antenna 106 is, for example, a transmitting or receiving antenna, but may be configured to have a transmitting antenna and a receiving antenna separately. For convenience, the vehicle-mounted antenna 106 may perform short range wireless communication according to short range wireless communication standards such as Wi-Fi (registered trademark), which is used as a standard in multifunctional cellphones.

The vehicle communication module 31 converts a baseband signal input from the collation ECU 30 to the carrier signal by performing a predetermined processing, such as coding, modulating, and digital to analog conversion. Then, the vehicle communication module 31 outputs the carrier signal generated based on the baseband signal to the vehicle-mounted antenna 106 and radiates the carrier signal as a radio wave.

The vehicle communication module 31 extracts the data from the received signal by performing, to the signal input from the vehicle-mounted antenna 106, predetermined processing, such as analog to digital conversion, demodulation, and decoding. Then, the vehicle communication module 31 transmits the extracted data to the collation ECU 30.

The vehicle state sensor 32 is a sensor group that detects various information related to the vehicle 105, such as a traveling state and an operation state. Examples of the vehicle state sensor 32 include a vehicle speed sensor that detects a speed of the vehicle, a shift position sensor that detects a shift position, and the like.

The start SW 33 is a switch requesting start of a traveling drive source of the vehicle. The start SW 33 is provided, for example, in front of the driver's seat. For example, the start SW 33 may be a mechanical button switch.

The locking or unlocking SW 34 is a switch requesting locking or unlocking of vehicle doors of the vehicle, such as a driver's seat door, a passenger seat door, and a trunk room door. The locking or unlocking SW 34 is provided, for example, on the outer door handle of each of the driver's seat and passenger's seat. The locking or unlocking SW 34 is provided on the trunk room door, for example, a rear bumper. The locking or unlocking SW 34 may be provided by, for example, a touch switch or a mechanical button switch.

The body ECU 35 locks and unlocks each door of the vehicle by outputting, to a door lock motor provided in each vehicle door, a driving signal for controlling locking and unlocking of each door of the vehicle. The body ECU 35 outputs a lock signal to a door lock motor to lock the door. The body ECU 35 outputs an unlock signal to the door lock motor to unlock the door. The locking or unlocking SW 34 for each door of the vehicle is connected to the body ECU 35. The body ECU 35 acquires the signal from the locking or unlocking SW 34 and detects the operation on the locking or unlocking SW 34.

The power unit ECU 36 is an electronic control device that controls the traveling drive source such as an internal combustion engine or a motor generator of the vehicle. When the power unit ECU 36 obtains a start permission signal for the traveling drive source from the collation ECU 30, the power unit ECU 36 starts the traveling drive source of the vehicle. The power unit ECU 36 also functions as an ECU that executes a process of supporting the driving operation of an occupant seated in the driver's seat.

The collation ECU 30 includes, for example, a processor, a memory, an I/O, and a bus that connects these components, and executes various processes related to the authentication for permitting the user to use the subject vehicle by executing a control program stored in the memory. The memory here is a non-transitory tangible storage medium that stores computer readable programs and computer readable data. The non-transitory tangible storage medium is implemented by a semiconductor memory, a magnetic disk, or the like. The collation ECU 30 executes a vehicle related process for implementing the smart entry system or the like by running the various programs on the CPU.

Figure 4:
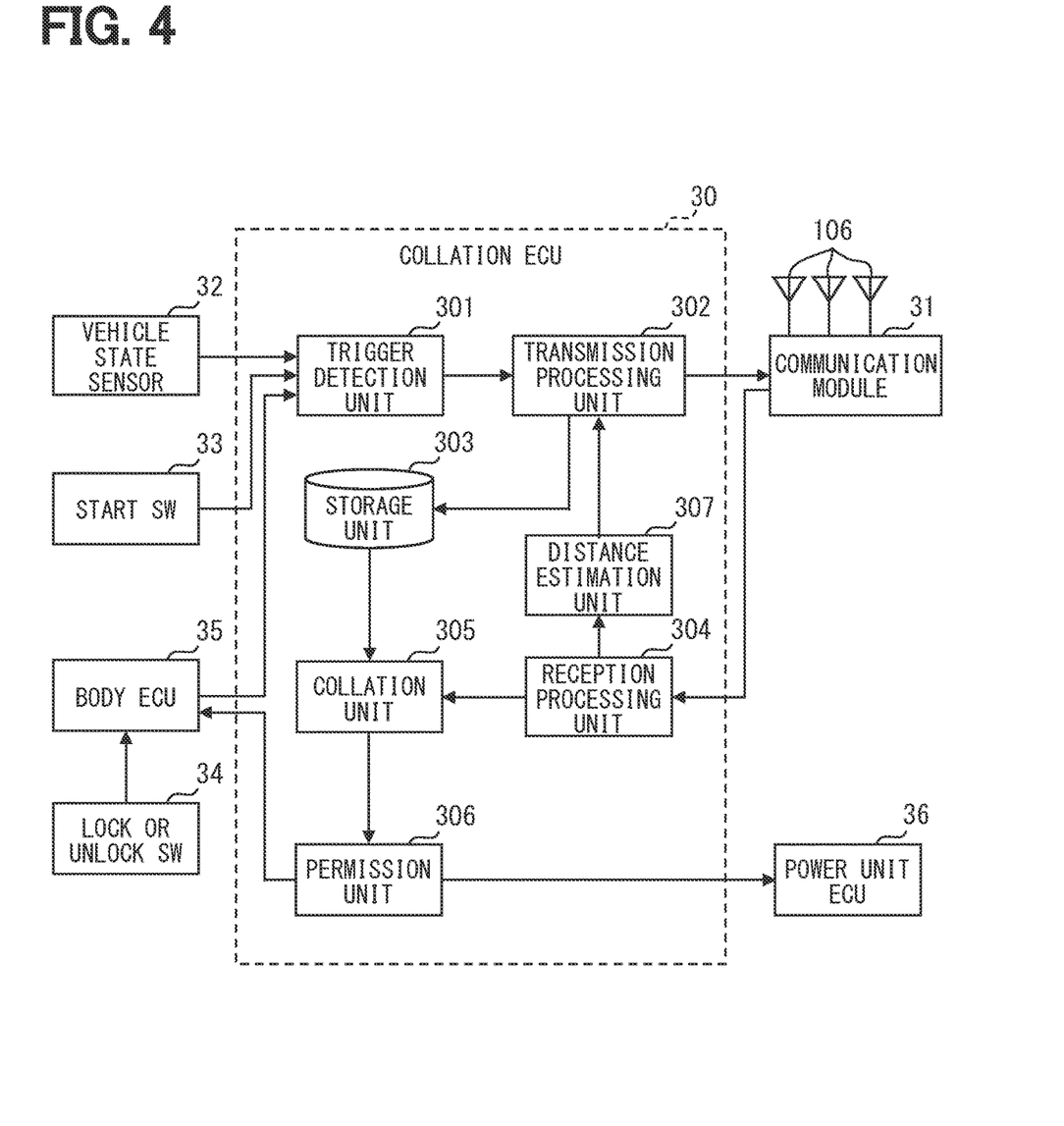
FIG. 4 is a block diagram showing a collation ECU.

The following will describe an example of a schematic configuration of the collation ECU 30 with reference to FIG. 4. As shown in FIG. 4, the collation ECU 30 includes a trigger detection unit 301, a transmission processing unit 302, a storage unit 303, a reception processing unit 304, a collation unit 305, a permission unit 306, and a distance estimation unit 307 as functional blocks. This collation ECU 30 corresponds to the in-vehicle device 103. In addition, partial or all of the functions executed by the collation ECU 30 may be configured as a hardware, such as one or more of ICs or the like. Alternatively, the partial or all of functions executed by the collation ECU 30 may be implemented by a combination of hardware manner and software manner which adopts a processor to execute the functions.

The reception processing unit 304 receives the response signal transmitted from the portable device 102 via the vehicle communication module 31. The reception processing unit 304 acquires information related to the phase from the response signal transmitted from the portable device 102. The reception processing unit 304 transmits the information related to the phase of the received response signal to the distance estimation unit 307.

The distance estimation unit 307 calculates the distance to the portable device 102 based on the phase received by the vehicle-mounted antenna 106. The distance estimation unit 307 calculates the distance to the portable device 102 using the phases of the multiple response signals transmitted from the reception processing unit 304, for example, phase difference between one of the response signal and a different one of the response signal. The distance estimation unit 307 generates at least two sets of combinations of the distance estimation phase at one frequency and the distance estimation phase at a different frequency, and estimates the distance for each of the at least two sets of combinations, based on phase difference between the distance estimation phase at one frequency and the distance estimation phase at the different frequency included in each of the at least two sets of combinations. The distance estimation unit 307 adopts the estimated distance when the difference between distances corresponding to the at least the at least two sets of combinations is within a predetermined range, and does not adopt the estimated distance when the difference between distances is out of the predetermined range.

The transmission processing unit 302 transmits a request signal for collation via the vehicle communication module 31. The transmission processing unit 302 generates multiple distance measuring radio waves for distance measuring purpose, and transmits the multiple distance measuring radio waves via the vehicle communication module 31. The transmission processing unit 302, functioning as a data generating unit, determines a phase shift amount from a reference phase following the predetermined generating rule and generates distance measuring radio waves by applying the phase shift amount. The distance measuring radio wave with reference phase has a phase shift amount of 0 and has a phase of 0 when being transmitted. When the phase shift amount is $\pi/2$, the phase is shifted $\pi/2$ from the reference phase of the distance measuring radio wave, that is, the phase of the distance measuring radio wave is $\pi/2$ when being transmitted.

The transmission processing unit 302 generates multiple distance measuring radio waves at multiple different frequencies. The generating rule in the present embodiment shifts the phase by a predetermined phase shift amount at a predetermined timing. The predetermined timing is a timing pre-synchronized between the portable device 102 and in-vehicle device 103. Therefore, when the transmission processing unit 302 generates the distance measuring radio wave, the phase is shifted by a predetermined value (i.e., $\pi/2$) at the predetermined timing. The predetermined value is a value excluding $2n\pi$. Here, n is a natural number. Alternatively, the generating rule may shift the phase when the frequency is at a predetermined frequency. Alternatively, the generating rule which shifts the phase by the predetermined phase shift amount at the predetermined timing, may be combined with the generating rule which shifts the phase when the frequency is at the predetermined frequency.

The storage unit 303 may be provided by an electrically rewritable non-volatile memory, and stores information, for example, vehicle ID. The storage unit 303 stores various programs and the like for implementing a smart entry system and the like.

The collation unit 305 functions as a device authentication unit for authenticating whether or not the portable device 102 is a preset valid portable device 102 using communication with the portable device 102. Specifically, the collation unit 305 receives, via the vehicle communication module 31, the response signal as a response to the request signal, and collates the portable device 102 by collating the ID in the response signal. The collation is performed between the terminal ID included in the response signal received from the portable device 102 and the vehicle ID stored in the storage unit 303. When the collation is successful, the portable device 102 of the user is authenticated to be the valid device.

The trigger detection unit 301 detects a trigger related to use of the subject vehicle. The use of the subject vehicle includes opening door of the vehicle for the user to get on, starting the subject vehicle, opening door of trunk room, and the like.

A trigger relating to opening the door of the vehicle for the user to get on (hereinafter referred to as a boarding trigger) may be detected as follows. The trigger detection unit 301 detects the boarding trigger when parking of the subject vehicle is determined based on the detection result of the vehicle state sensor 32, and locking or unlocking SW 34 of the door for driver seat or the door for passenger seat is detected. Parking of the subject vehicle may be determined, for example, from the fact that the shift position detected by the shift position sensor is the parking position. Parking of the vehicle may also be determined based on the vehicle speed detected by the vehicle speed sensor. For example, when a value of the vehicle speed indicates parking of the vehicle, the parking of the vehicle is determined. The operation on the locking or unlocking SW 34 may be detected from the signal of the locking or unlocking SW 34.

A trigger relating to starting the subject vehicle (hereinafter referred to as a starting trigger) may be detected as follows. The trigger detection unit 301 detects the starting trigger when it detects the start SW 33. The operation on the start SW 33 may be detected from the signal of the start SW 33.

A trigger relating to opening the door of the trunk room (hereinafter referred to as a trunk opening trigger) may be detected as follows. The trigger detection unit 301 detects the trunk opening trigger when the parking of the subject vehicle is determined based on the detection result of the vehicle state sensor 32, and the operation on the locking or unlocking SW 34 of the door of the trunk room is detected.

Based on the authentication result of the collation unit 305, the permission unit 306 functions as a device control unit, which permits using of the vehicle 105 when the portable device 102 is valid, and prohibits using of the vehicle 105 when the portable device 102 is invalid. The permission unit 306 transmits an unlock signal to the door lock motors of all of the vehicle doors to unlock all of the vehicle doors, when the trigger detection unit 301 detects the boarding trigger and when the collation unit 305 establishes the authentication.

When the trigger detection unit 301 detects the starting trigger and when the collation unit 305 establishes the collation, the permission unit 306 starts the traveling drive source by transmitting the start permission signal of the traveling drive source to the power unit ECU 36. The permission unit 306 transmits the unlock signal to the trunk room door to unlock the trunk room door, when the trigger detection unit 301 detects the trunk opening trigger and when the collation unit 305 establishes the collation. In this case, only the trunk room door is configured to be unlocked.

When there is no signal from the valid portable device 102, the permission unit 306 prohibits using of the function of the vehicle 105 based on the result of the authentication of the collation unit 305. This is to prevent unauthorized use of the vehicle 105.

Figure 5:
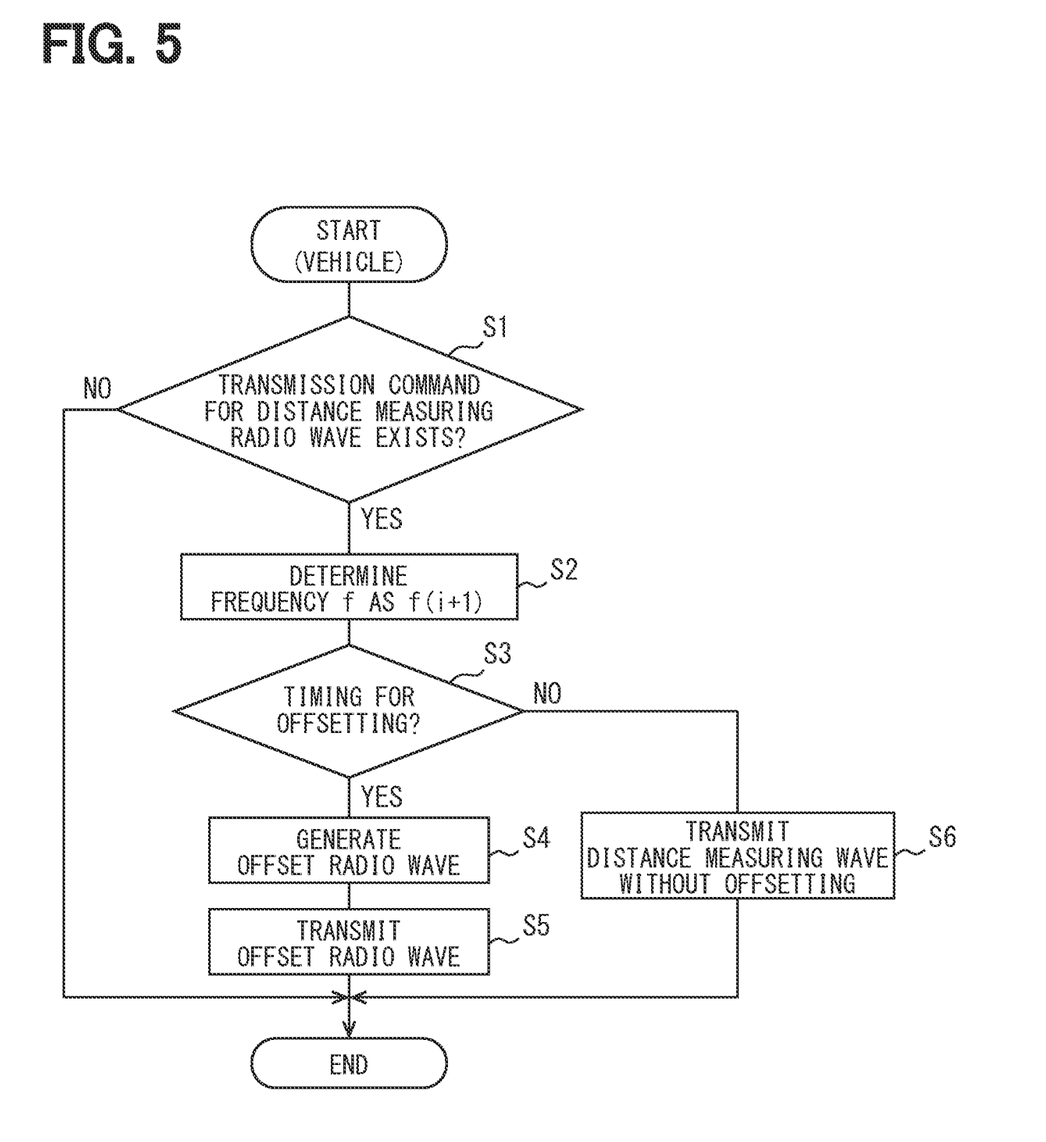
FIG. 5 is a flowchart showing a transmission process of the in-vehicle device.
Figure 6:
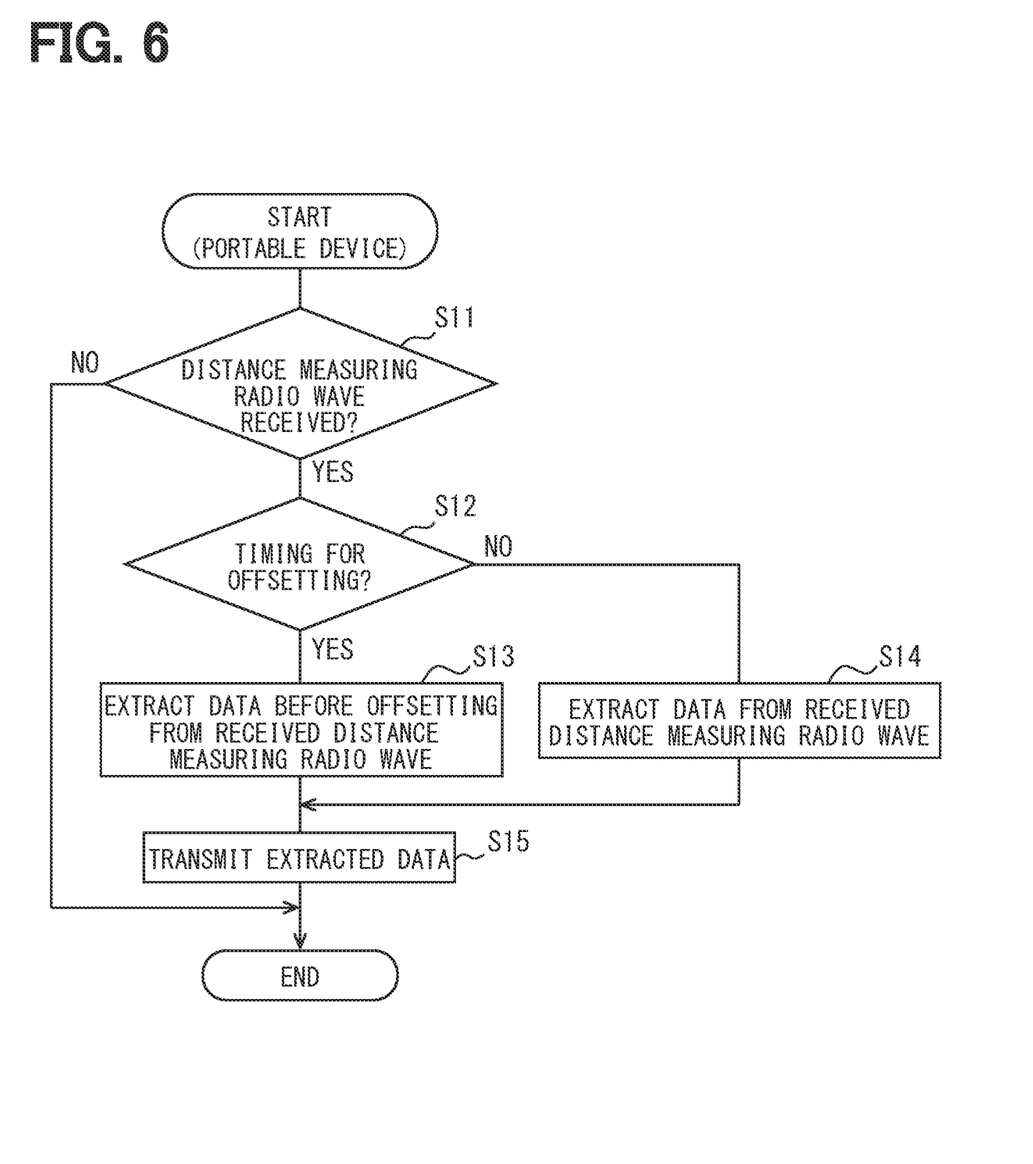
FIG. 6 is a flowchart showing a process of the portable device.
Figure 7:
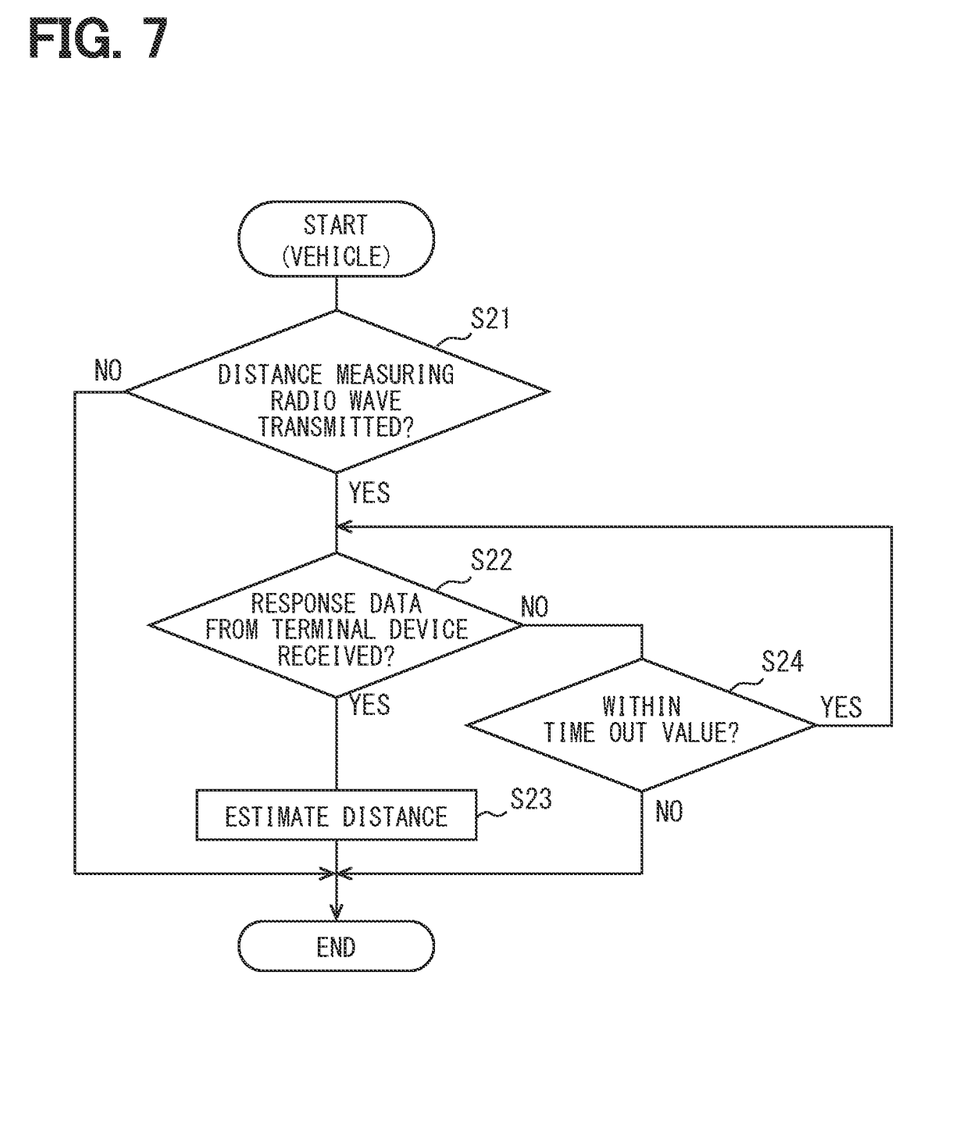
FIG. 7 is a flowchart showing a receiving process of the in-vehicle device.

The estimation process for estimating the distance between the in-vehicle device 103 and the portable device 102 will be described with reference to FIG. 5 to FIG. 7. The flow in FIG. 5 is repeatedly executed in a short period by the collation ECU 30 of the in-vehicle device 103. In step S1, the estimation process determines whether or not there is a transmission command of the distance measuring radio wave. When the transmitting command exists, step S2 is executed, and when the transmission command does not exists, the process ends. The transmission command is, for example, a command transmitted from other devices or a command transmitted periodically.

In step S2, frequency of the distance measuring radio wave to be transmitted is determined, and step S3 is executed. Multiple frequencies f, for example, k frequencies are set in advance. Herein, k indicates the number of frequencies. The multiple frequencies f are determined in an order from f (1) to f (k).

In step S3, the process determines whether the transmission timing of the radio wave is the timing for offsetting. When the transmission timing of the radio wave is the timing for offsetting, step S4 is executed. When the transmission timing of the radio wave is not the timing for offsetting, step S6 is executed. The timing for offsetting is predetermined between the in-vehicle device 103 and the portable device 102. The in-vehicle device 103 and the portable device 102 are synchronized in time. When the time at which the radio wave to be transmitted is within a predetermined offset time zone, the transmission timing of the radio wave is determined to be the timing for offsetting.

In step S4, when the transmission timing of the radio wave is the timing for offsetting, the offset radio wave is generated based on the distance measuring radio wave shifted by a predetermined phase (i.e., $\pi/2$) at the frequency determined in the step S2. Then, step S5 is executed.

The process transmits, in step S5, the offset radio wave generated in step S4, and the present flow ends.

In step S6, when the transmission timing of the radio wave is not the timing for offsetting, the distance measuring radio wave at the frequency set in step S2 is transmitted, and the process ends.

As described above, the flow shown in FIG. 5 generates, at the predetermined timings, the radio waves having offset phases.

The process executed in the portable device 102 will be described. The process described in FIG. 6 is repeatedly executed in a short period by the terminal control unit 20 of the portable device 102. In step S11, the process determines whether or not the distance measuring radio wave is received. When the distance measuring radio wave has been received, step S12 is executed, and when the distance measuring radio wave has not been received, the process ends.

In step S12, since the distance measuring radio wave is received, whether the transmission timing of the radio wave is the timing for offsetting is determined based on the stored generating rule. When the transmission timing of the radio wave is the timing for offsetting, step S13 is executed. When the time is not the timing for offsetting, step S15 is executed.

In step S13, since the received distance measuring radio wave is offset, the distance measuring radio wave is corrected to the phase before offset. The corrected phase is the distance estimation phase. Then, the process proceeds to S15. In step S14, since the received distance measuring radio wave is not offset, the phase of the received distance measuring radio wave is acquired as the distance estimation phase. Then, the process proceeds to step S15.

In step S15, the response data including the acquired distance estimation phase is transmitted to the in-vehicle device 103, and the present flow is ended.

In the present flow, the phase before offsetting is calculated when the reception time of the distance measuring radio wave is the timing for offsetting. Since a third party does not have information of the timing for offsetting, the third party does not know which one of the multiple distance measuring radio waves is offset. Thus, the third party cannot sort out the distance measuring radio waves which are offset from the multiple distance measuring radio waves which are not offset.

Process related to the in-vehicle device 103 will be explained below. The flow shown in FIG. 7 is repeatedly executed within a short time by the collation ECU 30 of the in-vehicle device 103. In step S21, whether the distance measuring radio wave is transmitted within a time out value is determined. When transmitted, step S22 is executed. When not transmitted, the present flow ends.

In step S22, the process determines whether the response data from the portable device 102 is received. When the response data is received, step S23 is executed. When the response data is not received, step S24 is executed. In step S24, the process determines whether the response data is received within the time out value. When received within the time out value, the process goes back to step S22. When received out of the time out value, the process ends. When the time out value elapses, the process determines that no response is received in response to the transmitted distance measuring radio wave.

Figure 8:
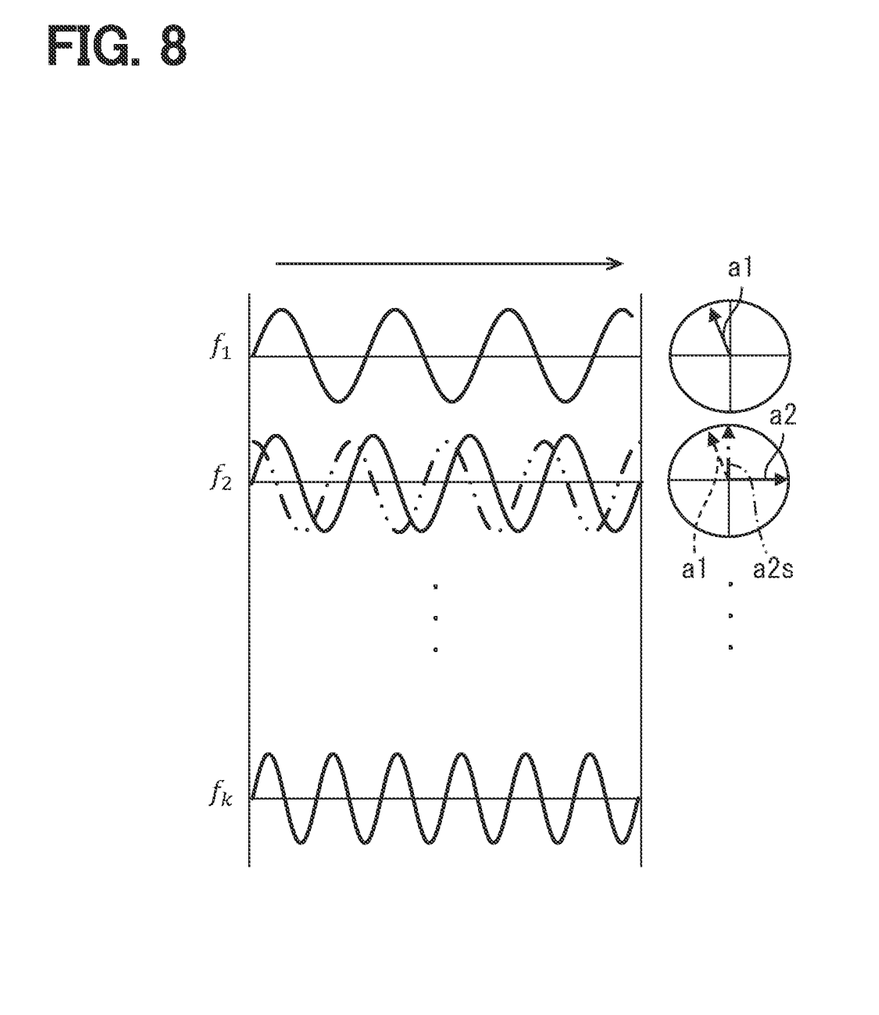
FIG. 8 is a diagram showing a generating rule.

In step S23, the distance is estimated using the received response data, and the present flow ends. The distance is estimated using the phase included in the acquired data. Specifically, as shown in FIG. 8, the distance between the in-vehicle device 103 and the portable device 102 can be calculated based on phases acquired at multiple frequencies. For example, the distance may be calculated using a phase difference between a first frequency f1, which functions as a reference frequency, and each of a second frequency f2 to the k-th frequency fk. The second frequency to the k-th frequency are different from the first frequency f1. Here, k is a natural number, for example, with a maximum value of 80. The distance estimation unit 307 estimates the distance by optimizing, for example, data acquired at multiple frequencies. The distance estimation unit 307 estimates the distance using the MUSIC (MUltiple Signal Classification) method as distance estimation algorithm.

In FIG. 8, for example, the radio wave at the second frequency f2 is transmitted as the offset radio wave. The dashed-dotted line wave, which indicates the radio wave at the second frequency f2, is shifted by $\pi/2$ from the solid line wave, which indicates the radio wave before offsetting. In the portable device 102, since the second frequency f2 is known as the frequency of offset radio wave, when extracting the phase, the response data is generated with a phase $a2s$ set back by $\pi/2$ as the original phase. Therefore, as shown in FIG. 8, the corrected phase $a2s$ is generated from the phase $a2$ of the second frequency f2 before correction. In this regard, the distance can be calculated based on the phase difference between the phase $a1$ of the first frequency and the corrected phase $a2s$ of the second frequency f2.

The distance is calculated corresponding to the first frequency, and is also calculated corresponding to a different frequency. That is, the distance is calculated for each of the combinations. When the calculated 79 distances are within the predetermined range, the calculation of distances are determined to be performed correctly. When one or more of the calculated distances are out of the predetermined range, the calculation of distances are determined to be performed incorrectly. At this time, the operation initiated by the portable device 102 on the vehicle may be controlled to be refused.

The in-vehicle system 100 as explained above, the transmission processing unit generates, according to the generating rule, distance measuring radio wave from the reference phase by applying the phase shift amount. The phase shift amount includes a situation that the phase is shifted and a situation that the phase is not shifted and the phase shift amount is equal to 0. Thus, when the generating rule is unknown, it is difficult to specify the reference phase. When the third party transmits illegal data to the portable device 102 and the in-vehicle device 103 using an illegal device, the distance cannot be properly estimated since the generating rule is unknown to the illegal device. Therefore, the process is able to eliminate communication from the third party.

The distance estimation unit estimates multiple distances using multiple combinations of frequencies. When the difference between the estimated multiple distances is within the predetermined range, the estimated distance is adopted. Because the distances are estimated using the phases of multiple frequencies, erroneous estimation can be restricted and the accuracy of estimation can be improved.

In this embodiment, the generating rule shifts the phase by the predetermined shift amount at a predetermined timing. Thus, a simple generating rule that can generate offset radio waves is provided.

Second Embodiment

Figure 9:
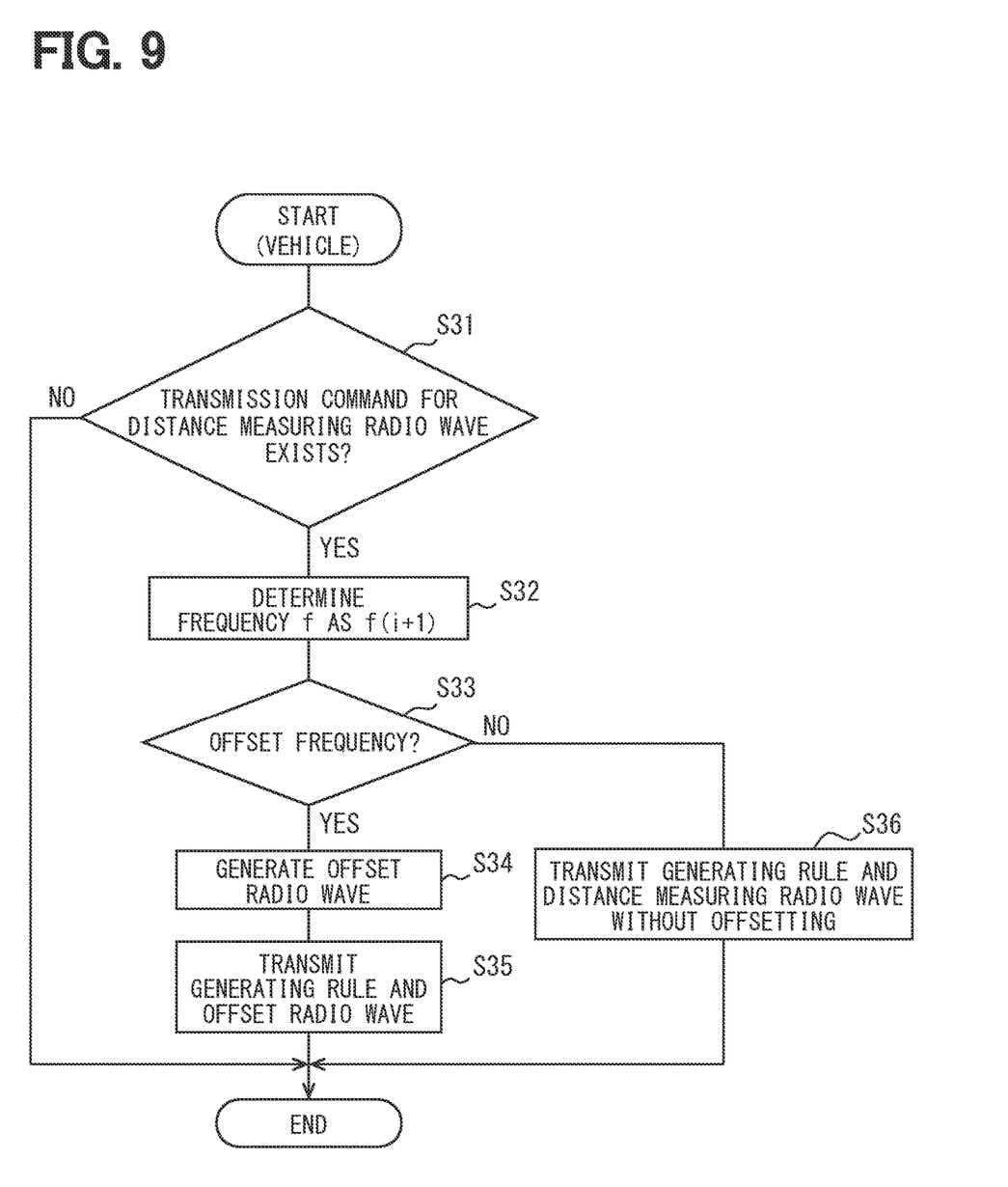
FIG. 9 is a flowchart showing a transmission process of an in-vehicle device of a second embodiment.

The second embodiment of the present disclosure is illustrated in FIG. 9. In this embodiment, the generating rule is different from that of the abovementioned first embodiment. Specifically, the generating rule shifts the phase by the predetermined value at the predetermined frequency. The transmission processing unit 302 generates distance measuring radio waves at at least three different frequencies. The transmission processing unit 302 generates the distance measuring radio waves such that a quantity of the generated distance measuring radio waves shifted from the reference phase following the generating rule is greater than a quantity of the multiple generated distance measuring radio waves not shifted from the reference phase.

When the multiple distance measuring radio waves are generated at 80 different frequencies, the transmission processing unit 302 controls the phases to be offset at 41 different frequencies, and controls the remaining phases to not be offset at remaining 39 frequencies.

The generating rule may randomly determine the frequencies for offsetting at each time when the distance measuring radio wave is generated. The generating rule may also encrypt the predetermined generating rule, and transmits, as generated data, the encrypted generating rule by including it in the distance measuring radio wave. In this regard, the terminal receiving circuit 21, which receives the distance measuring radio wave, decodes the generating data and acquires the generating rule. The phase determination unit 27 determines the distance estimation phase using the decoded generating rule. In this regard, security can be further improved.

FIG. 9 is similar to FIG. 5 explained above in the first embodiment, except that step S33 is different from FIG. 5. In step S33, the process determines whether the frequency of the distance measuring radio wave is an offset frequency. When the frequency of the distance measuring radio wave is the offset frequency, step S34 is executed. When the frequency of the distance measuring radio wave is not the offset frequency, step S36 is executed. The frequency for offsetting is preset by the generating rule. After the process, quantity of the offset distance measuring radio waves is controlled to be larger than the quantity of the distance measuring radio waves that are not offset. In the present embodiment, since the quantity of the distance measuring radio waves to be offset is larger than the quantity of the distance measuring radio waves without offsetting, the security can be further improved.

When the distance measuring radio wave is transmitted in step S35 or in step S36, the encrypted generating rule is also transmitted together with the distance measuring radio wave. Thus, the generating rule can be different for each time transmission of the distance measuring radio wave, and the security is further improved.

Other Embodiments

Although some embodiments of the present disclosure have been described above, the present disclosure is not limited to the abovementioned embodiments, and various modifications are contemplated as exemplified below.

The structure of the abovementioned embodiment is merely an example, and the scope of the present disclosure is not limited to the above description. Several technical scopes of the present disclosure are indicated by descriptions in the claims and should be understood to include all modifications within the scope equivalent to the descriptions in the claims.

In the above-described first embodiment, the functions implemented by the collation ECU 30 or the terminal control unit 20 may be implemented by hardware and software or a combination of the hardware and the software in different manner from the above-described configuration. The collation ECU 30 and the terminal control unit 20 may communicate with another control device, and another control device may execute a part or all of the process executed by the collation ECU and the terminal control unit. The collation ECU 30 or the terminal control unit 20 may be implemented by an electronic circuit, specifically, implemented by a digital circuit including multiple logic circuits or analog circuits.

In the above-described first embodiment, the distance estimation device estimates the distance between the in-vehicle device 103 and the portable device 102. However, the distance estimation device is not limited to such configuration. The distance estimation device may be configured in a different manner to estimate the distance between the communication device and the portable device. The communication device may be any type of device having a communication function, and is not limited to the above-described in-vehicle device 103. The portable terminal is not limited to the above-described portable device 102. The portable terminal may be any portable device that functions as a key of the in-vehicle device 103. For example, the portable terminal may be a mobile phone, a smartphone, or a mobile terminal.

What is claimed is:

1. A distance estimation system comprising:
a portable terminal; and
a communication device;
wherein the portable terminal includes:
a transmitting circuit and a receiving circuit performing data transmission and reception with the communication device by transmitting radio waves to the communication device and receiving the radio waves from the communication device; and
a microcomputer, by executing a control program stored in a first non-transitory storage medium, configured to control the transmitting circuit and the receiving circuit;
wherein the communication device includes:
a communication module coupled to an antenna and performing the data transmission and reception with the portable terminal by transmitting, via the antenna, the radio waves to the portable terminal and receiving, via the antenna, the radio waves from the portable terminal; and
a collation electronic control unit (ECU), by executing a control program stored in a second non-transitory storage medium, configured to:
control the communication module;
determine a phase shift amount from a reference phase following a predetermined generating rule;
generate measuring data by applying the phase shift amount determined under the predetermined generating rule;
generate a plurality of the measuring data at a plurality of different frequencies; and
control the communication module of the communication device to transmit the plurality of the generated measuring data to the portable terminal;
wherein the microcomputer of the portable terminal, by executing the control program stored in the first non-transitory storage medium, is configured to:
acquire, in response to the receiving circuit receiving the plurality of the measuring data from the communication device, a phase of the radio wave from each of the plurality of the measuring data;
determine, according to the predetermined generating rule, a phase for distance estimating purpose for each of the plurality of measuring data based on the acquired phase; and
transmit the phases for distance estimation purpose, which are determined from the plurality of the measuring data, to the communication device through the transmitting circuit;
wherein the collation ECU of the communication device, by executing the control program stored in the second non-transitory tangible storage medium, is configured to
generate at least two sets of combinations, each set including the phase for distance estimating purpose at one of the plurality of different frequencies and the phase for distance estimating purpose at a different one of the plurality of different frequencies;
estimate a distance between the portable terminal and the communication device based on a phase difference between the two phases for distance estimating purpose included in each of the at least two sets of combinations; and
adopt the estimated distance when a difference between the distances respectively calculated based on the at least two sets of combinations of the phases for distance estimating purpose is within a predetermined range, and does not adopt the estimated distance when the difference between the distances respectively calculated based on the at least two sets of combinations of the phases for distance estimating purpose is out of the predetermined range.

2. The distance estimation system according to claim 1, wherein
the predetermined generating rule shifts the phase by a predetermined value at a predetermined frequency.

3. The distance estimation system according to claim 1, wherein
the predetermined generating rule shifts the phase by a predetermined value at a predetermined timing.

4. The distance estimation system according to claim 1, wherein:
the portable terminal stores the predetermined generating rule in advance; and
the microcomputer of the portable terminal is configured to determine the phase for distance estimating purpose using the predetermined generating rule stored in the portable terminal.

5. The distance estimation system according to claim 1, wherein:
the predetermined generating rule is encrypted and included in the measuring data;
the receiving circuit of the portable terminal decodes the predetermined generating rule included in the measuring data when receiving the measuring data; and
the microcomputer of the portable terminal is configured to obtain the predetermined generating rule from the receiving circuit of the portable terminal.

6. The distance estimation system according to claim 1, wherein:
the plurality of different frequencies includes at least three different frequencies; and
within the plurality of measuring data generated by the collation ECU of the distance estimation system, a quantity of the plurality of measuring data having phases shifted from the reference phase is greater than a quantity of the plurality of measuring data having phases not shifted from the reference phase.

* * * * *